United States Patent [19]

Elias

[11] 3,792,914
[45] Feb. 19, 1974

[54] APPARATUS FOR THE PRODUCTION OF A WIDE-ANGLE IMAGE

[76] Inventor: Adrian Dan Elias, via Pinamonte da Vimercate 11, Milan, Italy

[22] Filed: Sept. 5, 1972

[21] Appl. No.: 286,528

[52] U.S. Cl. .................. 350/123, 352/43, 352/69, 353/7
[51] Int. Cl. ............................................. G03b 21/56
[58] Field of Search ... 350/117, 122, 123, 125, 137; 352/40, 43, 69; 353/7

[56] References Cited
UNITED STATES PATENTS

| 2,299,682 | 10/1942 | Conant | 350/125 UX |
| 1,262,511 | 4/1918 | Kelly | 350/123 X |
| 1,419,901 | 6/1922 | Lehnhoff-Wyld | 350/123 X |
| 3,311,017 | 3/1967 | Eckholm | 352/69 X |

FOREIGN PATENTS OR APPLICATIONS

| 540,068 | 2/1956 | Italy | 352/69 |

Primary Examiner—Monroe H. Hayes
Attorney, Agent, or Firm—Dr. G. Modiano; Dr. Albert Josif

[57] ABSTRACT

An apparatus for the reproduction of a wide-angle image onto a number of screens has a central opaque concave-convex screen with the convex side facing the projector for receiving a reversed image. A plurality of concave-convex semitransparent screens are disposed within the space bounded by the tangents from the peripheral edge of the central screen. Each semitransparent screen has its convexity facing a slit provided in a wall interposed between the opaque central screen and the semitransparent screens for receiving a corrected image projected onto the opaque central screen.

1 Claim, 8 Drawing Figures

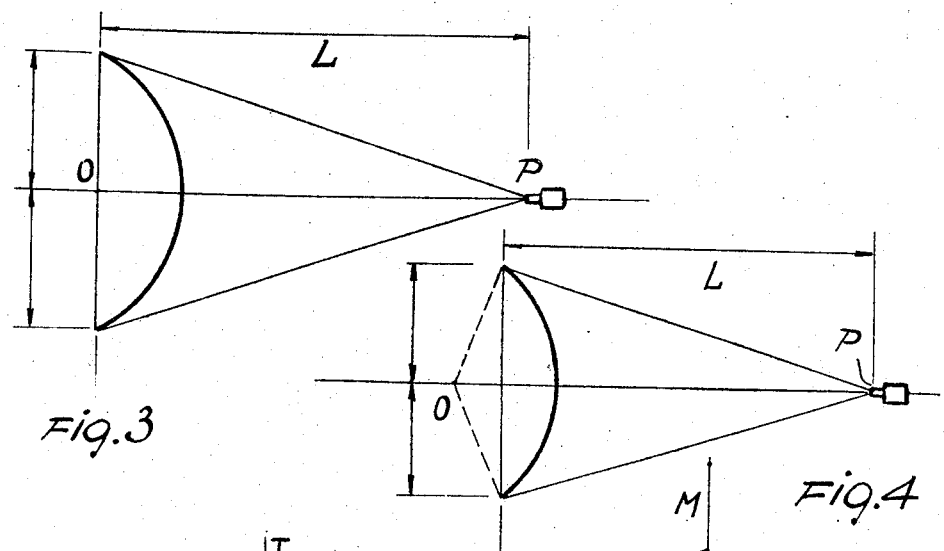
Fig.3
Fig.4
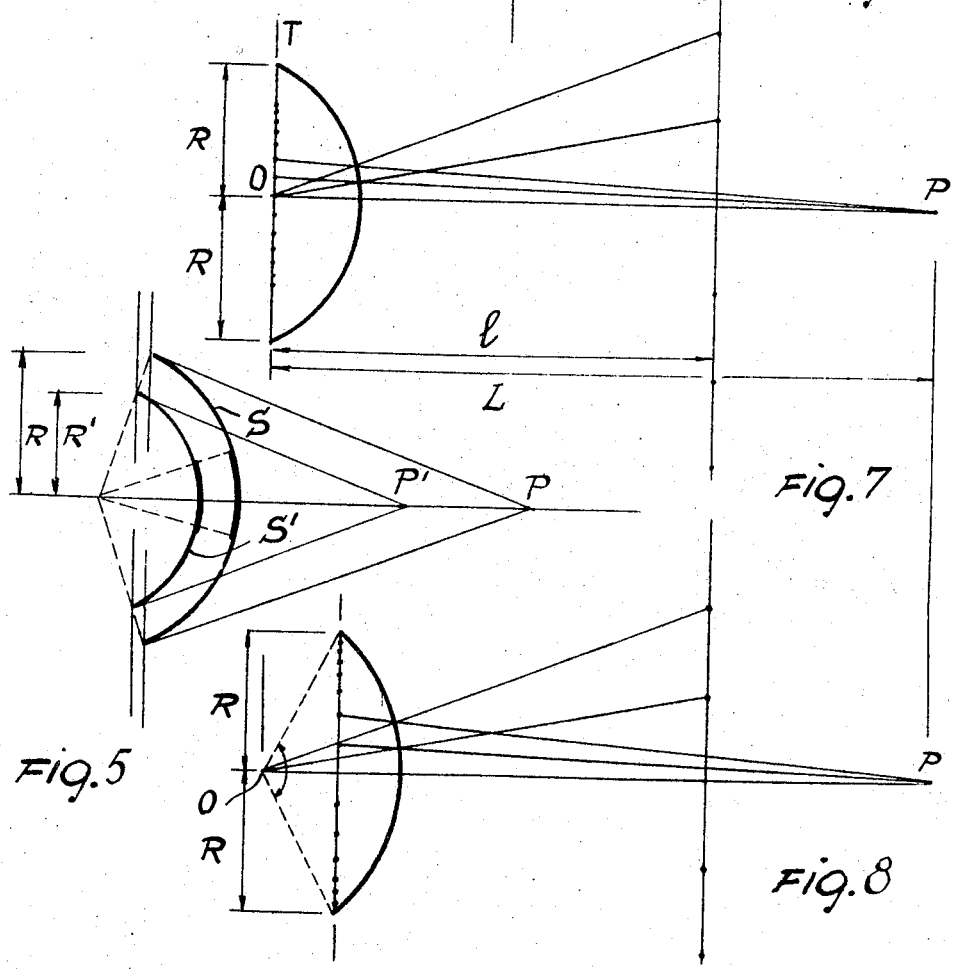
Fig.5
Fig.7
Fig.8

APPARATUS FOR THE PRODUCTION OF A WIDE-ANGLE IMAGE

BACKGROUND OF THE INVENTION

The present invention relates to a method for the projection on to a number of screens of images photographed with wide-angle lenses of the so called "fish eye" type or drawn in synthetic spherical perspective, and to the screens for the reproduction of these images.

The word "image" is meant to signify any figure or inscription obtained by any photographic procedure, such as an actual photograph, slide or film or the like, or by drawing carried out by any technique.

For the reproduction of images of this type, the image is at present projected on to a concave-convex surface and the observer must be disposed at a determined point situated on the axis of symmetry of said screen.

It can hence be seen that in order to enable observation by a number of spectators, a number of screens must be disposed, namely one screen for each spectator.

At present for projections of this type a number of screens and a number of projectors are used, i.e., one projector for each screen.

Obviously this method, in addition to being costly, gives rise to certain difficulties such as the difficult synchronisation of all projectors used.

SUMMARY OF THE INVENTION

An object of the present invention is to provide a projection method for wide-angle images which enables a single projector to be used, at the same time allowing a number of spectators to observe the projected image.

A further object of the present invention is to permit the reproduction of images viewed through an angle of 180°, practically without distortion.

These and further objects which will be more evident hereinafter are attained by a method for the reproduction of a wide-angle image to a number of screens, according to the invention, comprising the projection of a reverse image on to the convexity of a central concave-convex screen, a plurality of concave-convex screens being disposed within the space bounded by the tangents from the peripheral edge of said central screen, each screen of said plurality of screens having its convexity facing a slit provided in a wall interposed between said central screen and said each screen, said each screen being arranged to reproduce corrected the image projected on to said central screen.

BRIEF DESCRIPTION OF THE DRAWINGS

Further characteristics and advantages will be more evident from the description of a preferred but not exclusive embodiment of a method for the reproduction of a wide-angle image on to a number of screens, illustrated by way of non-limiting example with the aid of the accompanying drawing, in which:

FIG. 3 is a screen viewed from its centre through an angle of 180°;

FIG. 4 is a screen viewed from its centre through an angle of less than 180°;

FIG. 5 shows two screens of similar profile but of different dimensions;

FIG. 7 shows the graphical construction of the profile of a screen viewed from its centre through an angle of 180°;

FIG. 8 shows the graphical construction of the profile of a screen viewed from its centre through an angle of less than 180°.

DESCRIPTION OF THE PREFERRED EMBODIMENTS

Figure 6:
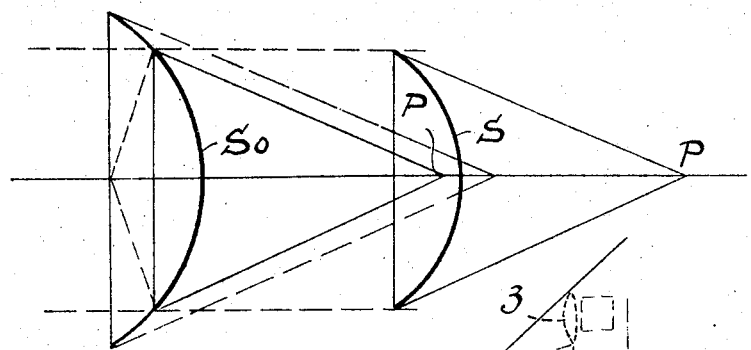
FIG. 6 shows the construction of a screen which permits wide-angle vision of less than 180°.
Figure 1:
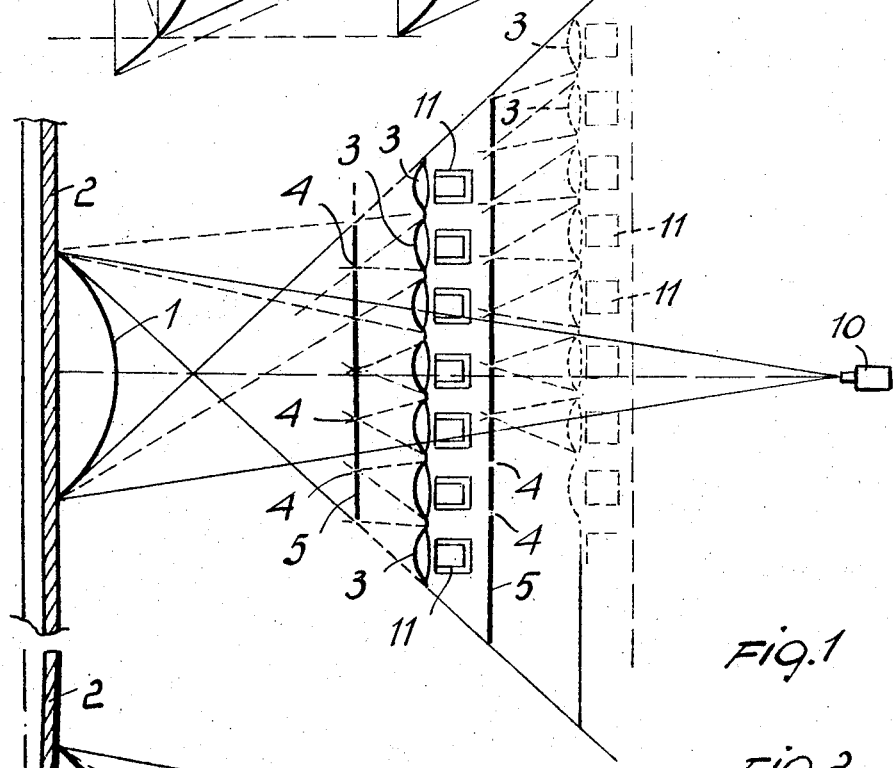
FIG. 1 is a plan view of a cinema hall for the projection of an image by the method according to the invention.
Figure 2:
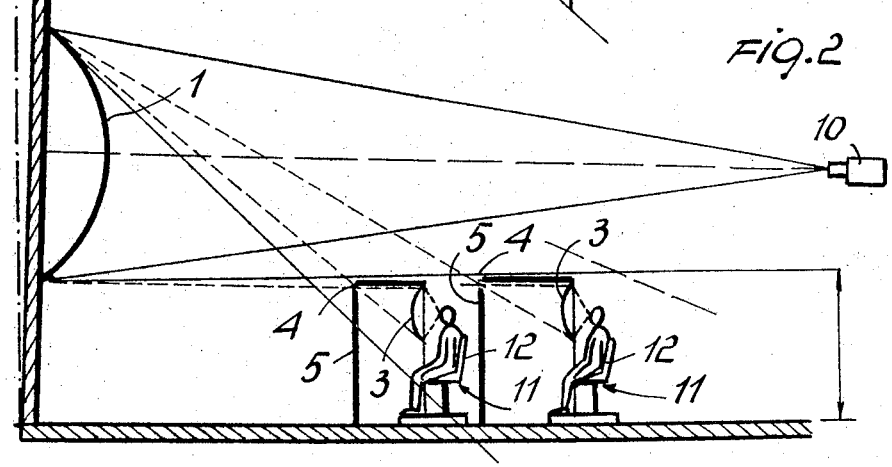
FIG. 2 is an elevational view of the cinema hall of FIG. 1.

With reference to the stated Figures, the wide-angle image is projected by a projector 10 on to the convexity of a central opaque screen 1.

Said central screen 1 consists of a opaque surface of convex form and is a body of rotation about its axis of symmetry.

Said central screen 1 is supported by a wall 2 inclined to the horizontal plane by an angle variable between 10° and 30°. In the space bounded by the tangents from the peripheral edge of said central screen 1 are placed semitransparent screens 3 of concave-convex form, the screens 3 being disposed preferably along a number of parallel rows. Said screens 3 have their convexity facing a slit 4 provided in an opaque wall 5 interposed between said screens 3 and said central screen 1. Said slits 4 are equipped with lenses and simple optical means, the sizes of the slits 4 and the type of optical equipment to be used being found easily by known methods, in relation to the shape and size of the projection hall to be built. The central screen is placed on the wall 2 at a height greater than the height of the walls 5 which are of such a height as to possibly allow the passage of a spectator between the rows of screens 3. A spectator must look at the concave part of the screen 3 from a point O on the axis of symmetry of said screen, and which will be called the centre of the screen.

We shall now examine generally the form which a screen must have in order to permit optimum projection of an image obtained with a wide-angle lens.

The screen is of concave-convex form constituted by the rotation of a surface about an axis of symmetry. The projector must be placed on the axis of symmetry at a point P on the convex side of the screen, whereas the observer must be at a point O on the concave side of the screen. The curvature of the screen must correct the perspective distortion of the projected image, and is a function of the distortion itself and of the distance of projection L considered as the distance between the point O and the point P at which the projector is placed.

It should be noted that the dimensions of the screen do not change the vision of the spectator in that he sees the image angularly, for example, as shown in FIG. 5 it can be seen that the two screens S and S', even though of different dimensions, give the spectator situated at O the possibility of seeing the image through the same angle α, if the position of the projector is moved from the point P to the point P'; in the same graphical representation, R and R' represent respectively the distances of the edges of the screens S and S' from the axis of symmetry of the screens.

Advantageously as shown schematically in FIGS. 3, 4 and 6, screens may also be used which permit wide-angle vision of less than 180°, in fact a screen viewed by the observer through an angle of 135° or even less covers the entire field of clear distinct vision of the spectator, and is sufficient to give the impression of being surrounded by the image.

Screens which have an angle of vision of less than 180° give certain considerable advantages with respect to screens which offer an angle of vision of 180°. A screen seen through an angle of 180° must be viewed from the centre O of the large circle from a distance equal to its depth, and furthermore the projector must have a depth of field equal to or greater than the screen in order to give perfect focus, and it must be added that the images, which already have a smaller lateral luminosity, become even more dark when projected on to the inclined sides of the screen, because of which on a 180° screen the edges appear very dark.

A screen S of the same diameter, but viewed through an angle of less than 180°, has a smaller depth and enables the spectator to stay further from the screen, and moreover the projector may have a smaller depth of field which makes vision clearer and sharper.

It should be noted that the sides of the screen are less inclined to the projection rays and in consequence the edges are more luminous.

We shall now examine the optimum curvature which a screen must have to make it suitable for the method according to the invention.

The curvature of the screen is related simultaneously both to a determined "fish eye" lens and to a predetermined projection distance. To obtain this curvature a scale M is used photographed from a predetermined distance 1 with a determined "fish eye" lens. The photograph of the scale M is enlarged on a plane T until it reaches the required screen diameter then with the observation point at O at a distance 1 from the plane M the curvature will be on the intersection of the homologous lines projected from the point P and the line joining the point O and the homologous points on the actual scale of the plane M.

The process is obviously analogous both if the screen is viewed from the point O through an angle of 180° and if viewed from the point O through an angle of less than 180°.

We shall now see how projection is effected by the method according to the invention.

The wide-angle reverse image is projected by the projector 10 situated at a certain distance from the central screen 1 on to this latter. The image projected on the screen 1 is reproduced by obscure chamber method on to the individual screens 3, disposed within the space bounded by the tangents from the peripheral edge of said central screen 1. The screens 3 and relative slits 4 must be placed within the space bounded by said tangents so that the entire image may be reproduced exactly and integrally. Each individual spactator is positioned on the concave side of the individual screens 3 and will have the line of his body and head resting on the back 12 of the seat 11 which also has the same inclination to the horizontal as the central screen 1 and as the screens 3, so that he may see the image without distortion.

From the aforegoing description it can be seen that the method according to the invention allows vision of a wide-angle image to a number of spectators, without having to use a number of projectors.

The invention so conceived is susceptible to numerous modifications all of which fall within the scope of the inventive idea.

I claim:

1. An apparatus for the reproduction of wide-angle images, comprising an opaque concave-convex screen, means projecting a reversed wide-angle image on the convexity of said opaque screen, a plurality of semitransparent concave-convex screens, being of convexity similar in form to that of said opaque screen, said semitransparent screens being arranged within the space bounded by the tangets from the peripheral edges of said opaque screen and outside the cone of projection of said projecting means, each of said semitransparent screens having the convex side bulging towards the convexity of said opaque screen, and at least one opaque wall arranged between said opaque screen outside its frontal area and each of said semitransparent screens and provided with a plurality of slits each facing the convexity of one of said semitransparent screens and provided with optical means, thereby allowing the image projected on said opaque screen to be reproduced on said semitransparent screens, the concave side of which are arranged adjacent a viewer.

* * * * *